US011396040B2

(12) United States Patent
Tripp et al.

(10) Patent No.: US 11,396,040 B2
(45) Date of Patent: Jul. 26, 2022

(54) FASTENING DEVICE, FASTENING DEVICE SYSTEM AND METHOD FOR FEEDING FASTENERS

(71) Applicant: NEWFREY LLC, New Britain, CT (US)

(72) Inventors: Andreas Tripp, Giessen (DE); Stefan Lippert, Giessen (DE)

(73) Assignee: NEWFREY LLC, New Britain, CT (US)

( * ) Notice: Subject to any disclaimer, the term of this patent is extended or adjusted under 35 U.S.C. 154(b) by 0 days.

(21) Appl. No.: 17/313,426

(22) Filed: May 6, 2021

(65) Prior Publication Data

US 2021/0346940 A1 Nov. 11, 2021

(30) Foreign Application Priority Data

May 6, 2020 (EP) .................................. 20173309

(51) Int. Cl.
*B21J 15/32* (2006.01)
*B21J 15/02* (2006.01)
*B21J 15/28* (2006.01)
*B25J 11/00* (2006.01)
*B23P 19/00* (2006.01)

(52) U.S. Cl.
CPC ............. *B21J 15/32* (2013.01); *B21J 15/025* (2013.01); *B21J 15/28* (2013.01); *B23P 19/005* (2013.01); *B25J 11/007* (2013.01)

(58) Field of Classification Search
CPC ..... B25J 11/007; B23P 19/005; B23P 19/001; B23P 19/002; B23P 19/003; B23P 19/004; B21J 15/025; B21J 15/105; B21J 15/28; B21J 15/32
See application file for complete search history.

(56) References Cited

U.S. PATENT DOCUMENTS

| | | | | |
|---|---|---|---|---|
| 2,101,924 A | * | 12/1937 | Turnquist | B21J 15/10 227/62 |
| 4,501,380 A | * | 2/1985 | Welch | B23P 19/003 221/298 |
| 4,618,053 A | * | 10/1986 | Taga | A41H 37/04 221/116 |
| 6,027,004 A | * | 2/2000 | Ramella | B25C 1/003 227/138 |

(Continued)

FOREIGN PATENT DOCUMENTS

| | | | | |
|---|---|---|---|---|
| DE | 10335085 A1 | 2/2005 | | |
| DE | 102009040764 A1 | * | 3/2011 | ............ B21J 15/025 |

(Continued)

*Primary Examiner* — Matthew P Travers
(74) *Attorney, Agent, or Firm* — Michael P. Leary

(57) ABSTRACT

A fastening device for feeding fasteners to a workpiece and for joining it, the fastening device comprising a fastening tool, a fastening device system. The fastening device including a magazine arrangement mounted on the fastening tool. The magazine arrangement having a magazine for holding a fastener, a magazine plate, and a base plate. The magazine plate includes a plate body and a closure arrangement with a closure slider adapted to move between an open position and a closed position, and a toggle mechanism adapted to move the closure slider from the closed position to the open position.

20 Claims, 7 Drawing Sheets

(56) References Cited

U.S. PATENT DOCUMENTS

| | | | | |
|---|---|---|---|---|
| 6,789,309 | B2* | 9/2004 | Kondo | ............... B21J 15/285 |
| | | | | 901/41 |
| 8,047,416 | B2 | 11/2011 | Davies et al. | |
| 8,805,575 | B1* | 8/2014 | Bloch | ................ B21J 15/32 |
| | | | | 29/709 |
| 8,850,685 | B2 | 10/2014 | Craythorn et al. | |
| 9,409,227 | B2 | 8/2016 | Ivo et al. | |
| 2011/0252626 | A1* | 10/2011 | Williams | ............. B23P 19/001 |
| | | | | 29/700 |
| 2012/0167366 | A1* | 7/2012 | Mauer | ............... B21J 15/025 |
| | | | | 29/407.01 |
| 2018/0015530 | A1* | 1/2018 | Kohlstädt | ............. B23P 19/001 |

FOREIGN PATENT DOCUMENTS

| | | | | |
|---|---|---|---|---|
| EP | 2629905 | B1 | 7/2014 | |
| EP | 3530369 | A1 * | 8/2019 | ............ B21J 15/025 |
| WO | 0007751 | A1 | 2/2000 | |
| WO | 07031701 | A1 | 3/2007 | |

* cited by examiner

FASTENING DEVICE, FASTENING DEVICE SYSTEM AND METHOD FOR FEEDING FASTENERS

CROSS-REFERENCE TO RELATED APPLICATIONS

This application claims priority from European Patent Application No. 20173309.4, filed May 6, 2020, the disclosure of which is incorporated herein by reference in its entirety.

BACKGROUND OF THE INVENTION

The present invention concerns a fastening device, a fastening device system and a method for feeding fasteners to a fastening tool that can be moved by means of a programmable handling device and on which is mounted a magazine for accommodating at least one fastener.

In the field of fastening technology, it is known to make joints using fasteners. These methods include, for example, the fastening of fasteners to workpieces, wherein the fasteners in this case are oftentimes used as anchors for further attachment. Such fastening methods are known in the form of stud welding, adhesive stud bonding, and thermoplastic stud fastening. In these methods, the studs may be rotationally symmetric fasteners, but may also be irregularly shaped anchors.

In addition, it is known to join at least two workpieces to one another by means of fasteners. Such methods include, e.g., riveting methods, for instance the self-piercing riveting method.

Especially in the field of automotive engineering, such fastening methods have been well-established for some years, particularly in body manufacture.

In high-volume production it is preferred to move the fastening tools by means of a programmable handling device, such as a robot. In this case it is likewise preferred for the fasteners to be fed to a fastening tool attached to a robot arm. To this end, it is known to connect the fastening tool to a feed device by a feed hose. For instance, WO 00/07751 discloses fasteners which are pre-loaded in a package and dispense via at least one fastener delivery tube that interconnects the setting tool to a fastener feeder device.

It is also known to connect the feed device to a docking station by a feed hose, notably from WO 07/031701 or DE10335085A1. In this case, a buffer for accommodating a plurality of fasteners is present on the fastening tool. In order to fill the magazine, the fastening tool is moved to the docking station where it is docked. The docking in this process is done in such a manner that both an outlet gate in the region of the docking station and an inlet gate of the buffer are opened mechanically by the docking procedure in order to establish a continuous connection between the feed device and the buffer. The expense this necessitates for mechanical actuators or transmissions is considerable. In addition, docking and undocking is a relatively time-consuming process.

Against this background, the applicant developed an improved method for feeding fasteners to a fastening tool that is movable by a programmable handling device and on which is mounted a magazine for accommodating at least one fastener. This method is depicted in EP2629905. The method consists in moving the magazine to a filling station, wherein the filling station has an always continuously open tube section with an outlet opening; orienting the magazine with respect to the outlet opening; opening an air seal of the magazine; and conveying at least one fastener to the tube section in such a manner that the fastener travels through the tube section and the outlet opening to reach the magazine, wherein the outlet opening is unblocked before orienting the magazine and after conveying the fastener to the magazine.

However, there is still a need to improve such fastening devices with magazine for better fastening, filling and maintenance performances.

BRIEF SUMMARY OF THE INVENTION

This object is attained according to a first aspect of the invention by a fastening device according to claim 1. More particularly, the present invention is directed to a fastening device comprising: a fastening tool that is movable by programmable handling device, a magazine arrangement mounted on the fastening tool, the magazine arrangement having a magazine for accommodating at least one fastener, the magazine having an inlet and an outlet, and wherein the magazine comprises a magazine hose; a magazine plate extending at the inlet of the magazine, and a base plate extending along the magazine and to which the magazine is connected; a sensor adapted to detect the presence of a fastener in the magazine, characterized in that the magazine plate comprises a plate body and a closure arrangement, the closure arrangement having: a closure slider adapted to move between an open position, in which the inlet of the magazine is open and a closed position in which the inlet is closed, an elastic member elastically maintaining the closure slider in the closed position, a toggle mechanism adapted to move the closure slider from the closed position to the open position.

The toggle mechanism creates a robust automatic opening and closure when the magazine is in the vicinity of a feed device. No further actuator is necessary, the opening and closure of the magazine is thus passive, which limits the maintenance and risks of failures.

In an embodiment, the toggle mechanism is movable between a first position in which the closure slider is closed and a second position in which the closure slider is open, and wherein the toggle mechanism comprises a first arm, a second arm and a pivoting joint between the first and the second arms, such that first and second arms are rotationally connected.

In an embodiment, the closure slider comprises a first compressed air channel which communicates with the magazine hose when the closure slider is in the closed position.

In an embodiment, the magazine is a first magazine, the magazine hose is a first magazine hose, and wherein the magazine arrangement further comprises a second magazine for accommodating at least one second fastener, the second magazine having an inlet and an outlet, and wherein the second magazine comprises a second magazine hose, the magazine plate extends at the inlet of the second magazine and the base plate extends along the second magazine and the second magazine is connected to the base plate. The presence of two different magazines allows more flexibility. For instance, the fastening device can store two different types of fastener, the first type being in the first hose and the second type being in the second hose. The fastening device can also thus board an increased number of fasteners without increasing the length of the magazine hoses.

In an embodiment, the closure slider can comprise a second compressed air channel which communicates with the second magazine hose when the closure slider is in the closed position. Thus, a compressed air flow is integrated to the closure slider and automatically stopped when the closure slider is in the open position.

In an embodiment, the sensor is adapted to detect the presence of a fastener in the first and/or second magazine, and wherein the sensor is connected to the base plate, and a spacer is provided between the first and the second magazine hose, wherein the spacer comprises a demounting arrangement adapted to facilitate the removal and the replacement of the first and/or second magazine hose.

In an embodiment, the demounting arrangement comprises an elastic pin adapted to be moved between a locked position and a release position. The mechanical arrangement is easy to implement and particularly robust. A manipulator or a robot or an actuator can easily move the elastic pin from the locked position to the release position. The locked position corresponds to the rest position of the elastic pin.

In an embodiment, the spacer comprises a spacer body, an anchoring body and the elastic pin, wherein the anchoring body is fixed to the base plate and extends longitudinally orthogonal to the base plate, wherein the anchoring body comprises a first and a second recess, in which the elastic pin in the locked position can be elastically biased. The mechanical arrangement is easy to implement and particularly robust. The arrangement of the parts also allows an easy cleaning of the parts.

In an embodiment, the spacer body is slidable with regard to the anchoring body between a working position, in which the first and/or second magazine are adapted to receive one or a plurality of fasteners, and a maintenance position, in which the first and/or second magazine are adapted to be removed from the fastening device.

In an embodiment, the magazine arrangement further comprises an isolation module adapted to separate one fastener from a plurality of fastener and the outlets are connected to the isolation module. The isolation module improves the fastening performance with two magazines.

In an additional embodiment, the isolation module comprises a drawer adapted to slide between the outlet of the first magazine and/or the second magazine and an exit port. The mechanical arrangement is easy to implement and particularly robust.

The present invention is also directed to a fastening device system comprising a fastening device as previously described and a feed device, wherein the magazine arrangement has a centering element cooperating with a centering element from the feed device. It is thus possible to ensure that the magazine can always be aligned precisely with the feed device, and more particularly that an exit port of the feed device can always be aligned precisely with an inlet port of the magazine.

In an embodiment, the magazine arrangement has a centering recess, the feed device has a centering pin.

In an embodiment, the magazine arrangement has two centering recesses, the feed device has two centering pins.

In an embodiment, the centering pin extends longitudinally and has a non-constant cross-section. The non-constant section, and more particularly the larger portions of the non-constant section allows a tight fit of the centering pin, which insure a perfect alignment with reduced tolerances.

In an embodiment, the feed device has a docking surface and a filling station, the filling station comprising a feeding tube, and wherein the toggle mechanism comprises a bearing extending between two arms of the toggle mechanism and adapted to roll on the docking surface such that the pressure of the docking surface on the toggle element allows the toggle element to move the closure slider from the closed position to the open position. The bearing allows reducing the friction between feed device and magazine when opening the magazine.

In an embodiment, the toggle mechanism comprises a rear bearing arranged at a free end of the second arm of the toggle mechanism and adapted to roll on the magazine plate. This reduces the friction between the magazine plate and the closure arrangement.

Finally, the present invention is directed to a method for feeding fasteners to a fastening tool with a fastening device system as previously mentioned, the method comprising the steps of moving the magazine to a feed device, wherein the feed device has a tube section with an outlet opening; orienting the magazine with respect to the outlet opening; aligning the magazine and the feed device through centering elements; approaching the magazine and the feed device from each other such that a docking surface of the feed device pushes the toggle mechanism from a first position; conveying at least one fastener to the tube section in such a manner that the fastener travels through the tube section and the outlet opening to reach the first and/or second magazine.

This is also an object of the present application to disclose a fastening device comprising a fastening tool that is movable by programmable handling device, a magazine arrangement mounted on the fastening tool, the magazine arrangement having a first magazine for accommodating at least one first fastener, the first magazine having an inlet and an outlet and wherein the first magazine comprises a first magazine hose; a second magazine for accommodating at least one second fastener, the second magazine having an inlet and an outlet, and wherein the second magazine comprises a second magazine hose; a magazine plate extending at the inlet of the first and second magazine, and a base plate extending along the first and second magazine and to which the first and second magazine are connected; a sensor adapted to detect the presence of a fastener in the first and/or second magazine. The sensor is connected to the base plate, and a spacer is provided between the first and the second magazine hose, wherein the spacer comprises a demounting arrangement adapted to facilitate the removal and the replacement of the first and/or second magazine hose.

The applicant found that attaching the sensor to the base plate and not to the magazine directly do not alter the detection of the fastener within the magazine and on the contrary allows a better detection. Besides, the sensor adapted to detect the presence of the fastener in the magazine being not attached to the magazine anymore, allows an easy the maintenance, and for instance, a magazine hose replacement. The spacer has a centering function and allows the easy removal of the first and/or the second hose through the demounting arrangement. Such fastening device is thus easy to dismount and the magazine hose can be easily replaced or cleaned without considerable effort. Thus, the coupling of both the sensor attached to the base plate (and spaced from the magazine or magazine hose—or at least not connected to the magazine or magazine hose) and the spacer with the demounting arrangement enable a reduced demounting time, a better maintenance and improve the performances of the fastening device.

BRIEF DESCRIPTION OF THE DRAWINGS

Other characteristics and advantages of the invention will readily appear from the following description of embodiments, provided as non-limitative examples, in reference to the accompanying drawings.

DETAILED DESCRIPTION OF THE PREFERRED EMBODIMENTS

On the different figures, the same reference signs designate identical or similar elements.

Figure 1:
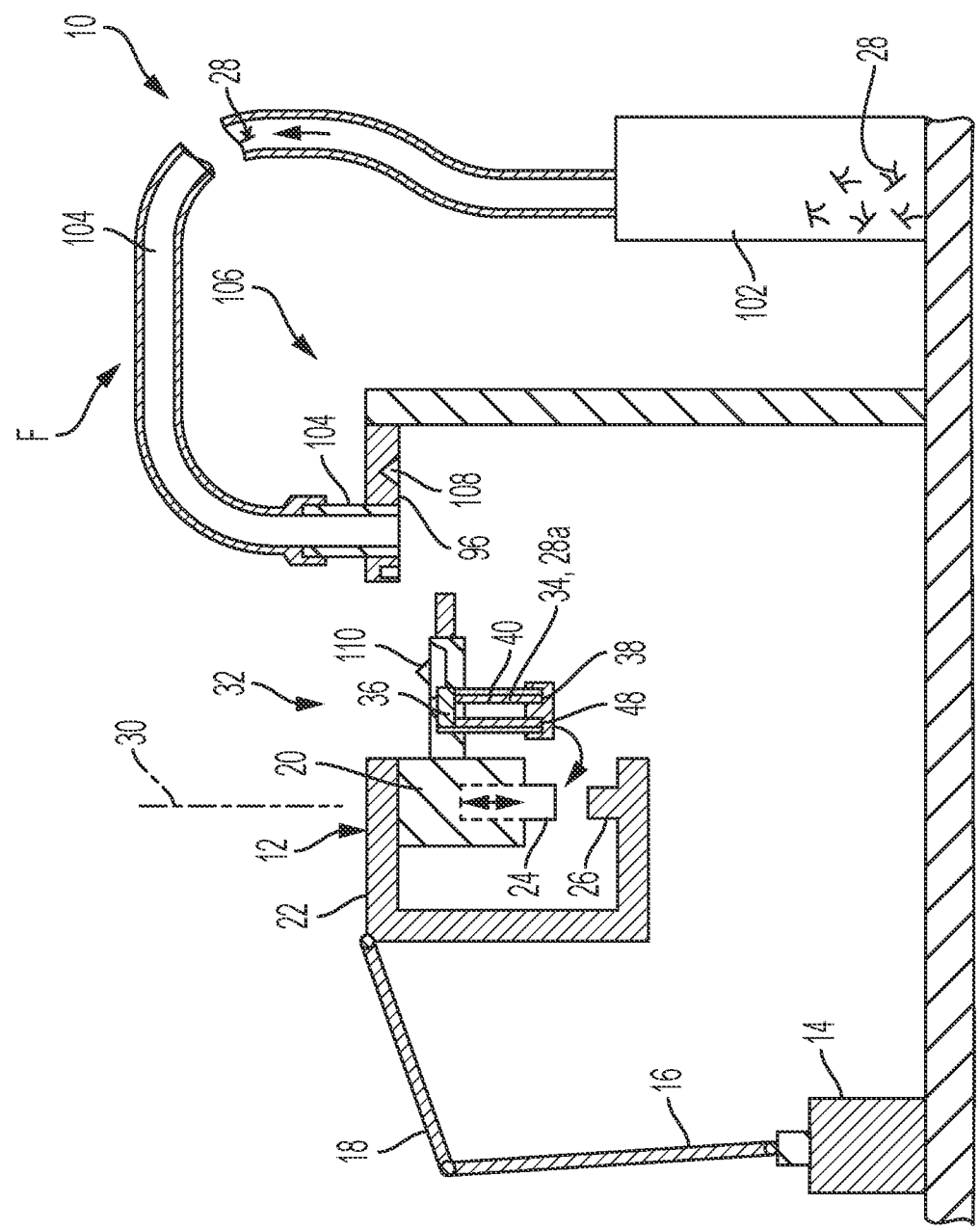
FIG. 1 shows a schematic representation of an embodiment of a fastening device system with a fastening device comprising a magazine attached to a fastening tool and a feed device.

FIG. 1 schematically shows an embodiment of a fastening device system 10 for producing joints using fasteners. In the present case, the fastening device system 10 is designed especially for self-piercing riveting. However, the fastening device system 10 may also be designed in corresponding fashion to produce stud joints (stud welding, adhesive stud bonding, etc.), for example.

The fastening device system 10 has a fastening device 12, which is attached to a programmable handling device in the form of a robot 14. More precisely, the robot 14 has, for example, a first arm 16 and a second arm 18, wherein the fastening device is affixed to the second arm 18.

Affixed to the fastening device 12 is a fastening tool 20, notably in the form of a self-piercing riveting tool. The fastening tool 20 includes a C-frame 22. Mounted on an upper end of the C-frame 22 is a punch 24—that can move in a fastening direction (as shown by the double arrow in FIG. 1)—of the fastening tool 20. Affixed to the other end of the C-frame 22 is a die 26.

The fastening tool 20 is designed to produce joints using fasteners 28. The fasteners 28 in the present case are self-piercing rivet elements.

For example, two or more workpieces (in the form of sheets made of the same or different materials, for example) can be inserted between the punch 24 and the die 26. Then a joining of these workpieces takes place: a self-piercing rivet element is pressed or punched into the workpiece arrangement by the punch 24. In the case of a tubular self-piercing rivet, a hollow section that was originally essentially cylindrical spreads apart radially in this process so that an undercut occurs within the workpiece arrangement. Self-piercing riveting processes of this type are generally known.

The motion of the punch 24 generally takes place along a fastening axis 30.

A magazine arrangement 32 is mounted to the fastening tool 20. In FIG. 1 the magazine arrangement 32 is mounted at the front of the C-Frame 22.

Figure 2:
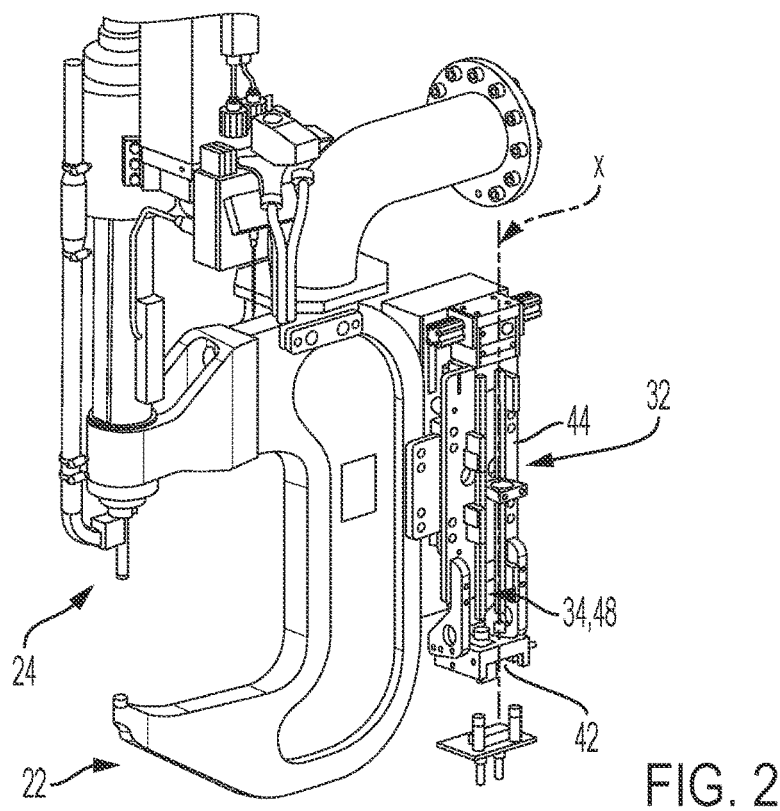
FIG. 2 shows an embodiment of a fastening device with a fastening tool and a magazine attached to the fastening tool.
Figure 12C:
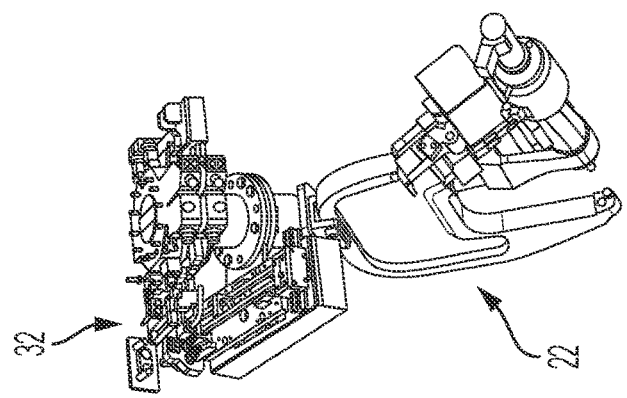
FIG. 12A, FIG. 12B, FIG. 12C are different embodiment of the setting tool with the magazine attached at different positions on the fastening tool.
Figure 12B:
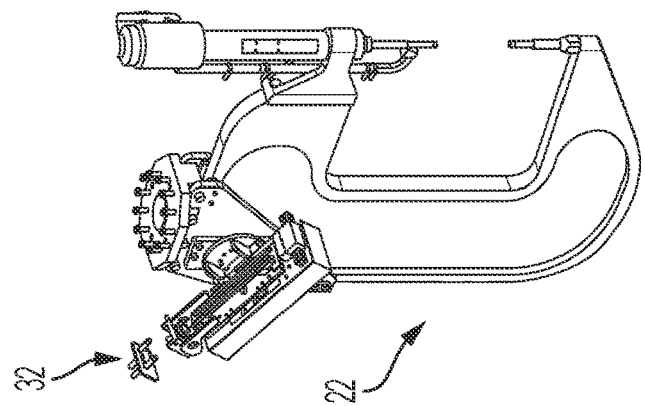
Figure 12A:
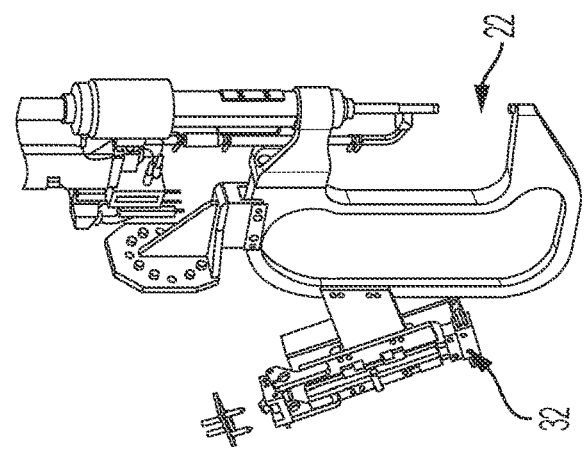

FIG. 2 and FIG. 12A to FIG. 12 C show different embodiments of the magazine arrangement mounted to a C-frame. For instance, in FIG. 2, the magazine arrangement is mounted on the back of the C-frame, at the opposite from the die 26 and the punch 24. The magazine arrangement extends along an axis which is sensibly parallel to the back of the C-frame. In FIGS. 12A and 12C the magazine arrangement is also mounted at the back of the C-frame but the magazine arrangement extends along an axis which forms an angle with the back of the C-frame. In FIG. 12B, the magazine arrangement is mounted at a top of a C-frame.

The magazine arrangement 32 has a first magazine 34 for accommodating at least one, preferably a plurality of first fasteners 28a. The first magazine 34 comprises an inlet 36 adapted to receive a fastener and an outlet 38 adapted to release a fastener. Between the inlet 36 and the outlet 38 extends a first magazine hose 40. The first magazine hose 40 extends along a magazine axis X. The magazine arrangement 32 additionally has a magazine plate 42 and a base plate 44. The magazine plate 42 extends at the inlet of the first magazine 34. The magazine plate for instance extends orthogonally to the magazine axis X. The base plate 44 extends along the first magazine 34, and more particularly along the first magazine hose 40. The first magazine 34 is mounted on the base plate 44.

A first sensor 46 is provided to detect the presence of a fastener in the first magazine 34, and more particularly in the first magazine hose 40. The first sensor 46 is connected to the base plate 44 and is at a non-zero distance from the first magazine hose 40. In other words, the sensor is not in contact with the first magazine hose 40 and is not mounted on the first magazine 34. The first sensor 46 is for instance a proximity transducer or a photoelectric sensor or a fork/ angled light barriers. In a preferred embodiment, an inductive tube sensor is used.

The magazine arrangement 32 may also comprise in an embodiment a second magazine 48 for accommodating at least one, preferably a plurality of second fasteners 28b. The second fastener may be identical or different from the first fasteners 28a. The second magazine 48 comprises an inlet 50 adapted to receive a fastener and an outlet 52 adapted to release a fastener. Between the inlet 50 and the outlet 52 extends a second magazine hose 54. The second magazine hose 54 may extend sensibly parallel to the first magazine hose 40. The magazine plate 42 extends at the inlet 50 of the second magazine 48. The second magazine hose 54 extends along the base plate 44. The second magazine hose extends along the base plate 44.

A second sensor 56, similar to the first sensor 46 is provided to detect the presence of a fastener in the second magazine 48, and more particularly in the second magazine hose 54. The second sensor 56 is connected to the base plate 44 and is at a non-zero distance from the second magazine hose 54. In other words, the second sensor 56 is not in contact with the second magazine hose 54 and is not mounted on the second magazine 48 but is directly mounted to the base plate 44.

Figure 3:
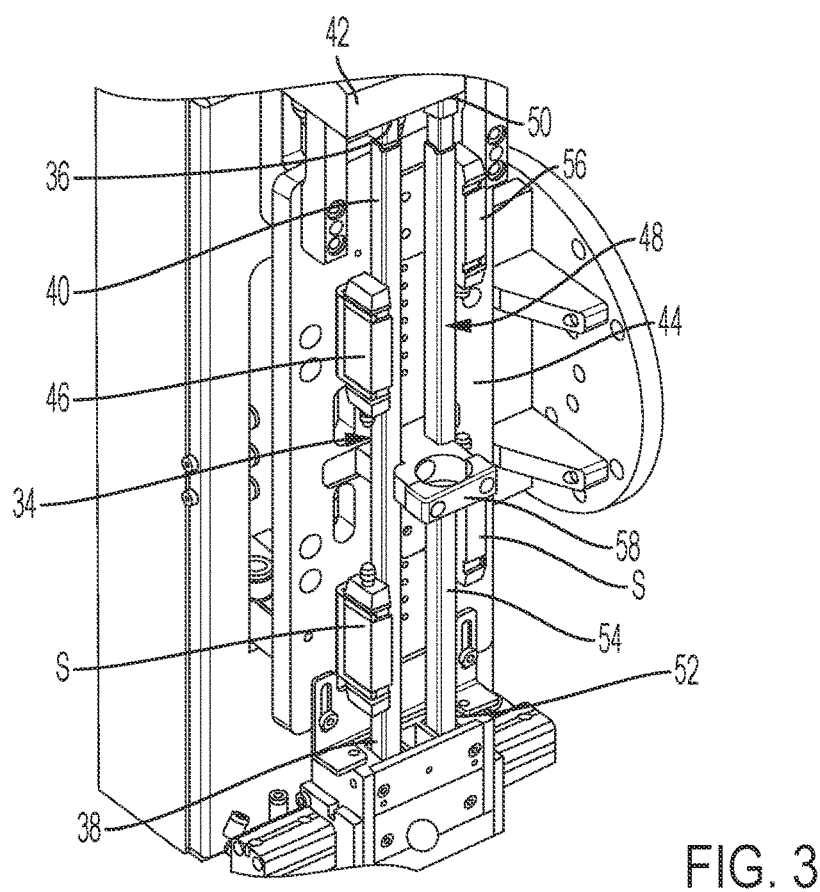
FIG. 3 shows a perspective of a first and second magazine hoses with a first and a second sensor attached to the base plate of the fastening device and a spacer.

For instance, as depicted in FIG. 3, the first sensor 46 and the second sensor 56 are arranged mounted to the base plate and at the vicinity of respectively the first and second magazine hoses 40, 54. More particularly, the first and second sensors do not extend between the first and second hoses 40, 54, but extend outwardly from the first and second magazine hoses 40, 54. A third and a fourth sensor S may also be arranged such that two different sensors detect a fastener in the first magazine hose 40, and two different sensors detect a fastener in the second magazine hose 54. The two sensors for the first magazine hose 40 may be arranged spaced apart, one sensor being in the vicinity of the inlet 36, wherein the other sensor is in the vicinity of the outlet 38. A similar arrangement can be provided for the second magazine hose 54.

A spacer 58 is provided between the first and second magazine hoses 40, 54. The spacer 58 allows to maintain the distance between the first and second magazine hoses 40, 54, but also allows an easy demounting of the first and/or second magazine or magazine hose. The spacer 58 comprises a spacer body 60 and a demounting arrangement 62.

The spacer body 60 comprises a first hose recess 72 to receive the first magazine hose 40, and a second hose recess 74 to receive the second magazine hose 50. The first and second hose recesses 72, 74 have for instance a section corresponding to the hose section. As depicted on the figures, the section can be square. In other embodiments, a circular section may be provided.

The demounting arrangement 62 comprises an elastic pin 64 and an anchoring body 66. The elastic pin 64 is elastically slidable within the spacer body 60. The elastic pin 64 is adapted to be moved between a locked position and a release position. The anchoring body 66 is fixed to the base plate 44. The anchoring body 66 comprises a first and a second recess 68, 70. The elastic pin 64 is adapted to protrude in the first or in the second recess 68, 70. The spacer body 60 is slidable with regard to the anchoring body 66.

Figure 4A:
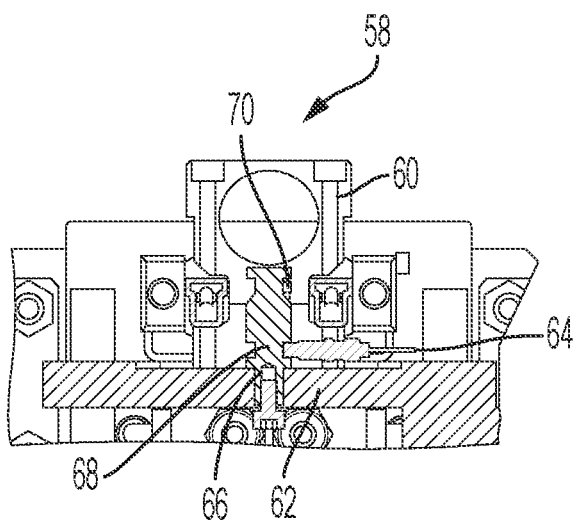
FIG. 4A and FIG. 4B show detailed views of the spacer with a body in a first and a second position.
Figure 4B:
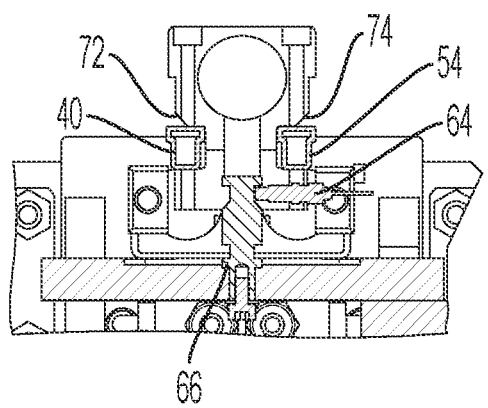
Figure 5:
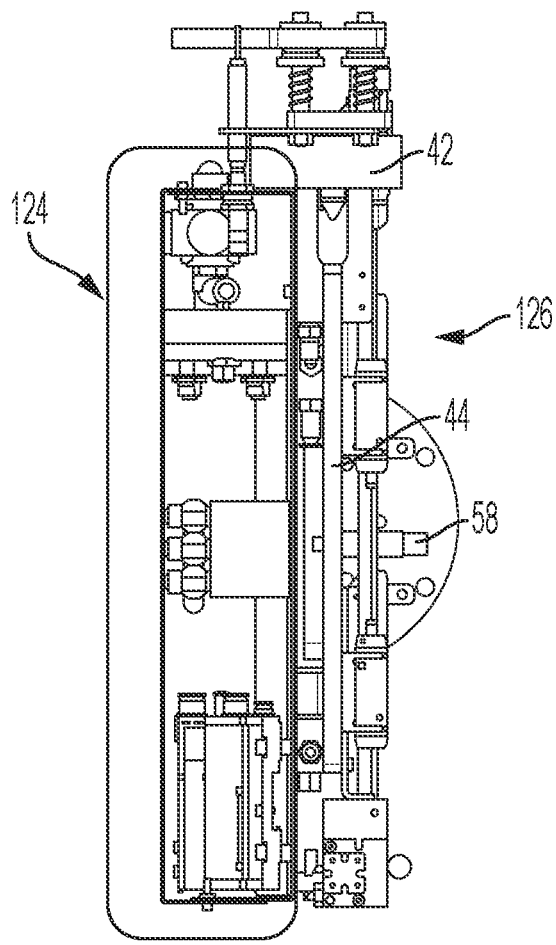
FIG. 5 shows a view of the controlled portion and the active portion of the fastening device.

In a working position, as shown in FIG. 4A, the anchoring body is inserted in the spacer body, such that the spacer body 60 is in contact with or at least in the vicinity of the base plate 44. The elastic pin 64 extends in the first recess 68 of the anchoring body 66. The first and second magazine hoses 40, 54 are able to receive, store and deliver fasteners 28a, 28b.

In order to move the spacer body 60 and the first and second magazine hoses 40, 54, the elastic pin 64 is pulled against the elastic force maintaining it in a locked position, such that the elastic pin 64 moves to a release position, and thus allow the spacer body 60 (with the first and second magazine hoses 40, 54 in the first and second hose recesses 72, 74) to slide with regard to the anchoring body 66. The spacer body 60 slides until the elastic pin 64 reaches the second recess 70 and elastically extends in the second recess 70. By doing so, the course of the spacer body 60 is stopped. The spacer body 60 is thus in a maintenance position, in which the first and/or second magazine hoses 40, 54 may be removed, cleaned, or replaced.

The second recess 70 comprises a side being a ramp adapted to allow the elastic pin 64 to slide up to the portion extending between the first and the second recesses 68, 70 when a manipulator pushes the spacer body back in the working position. The tip of the elastic pin 64 can then slide along the straight portion between the second and the first recesses 68, 70 until it arrives at the first recess 68 and is elastically biased into it.

As previously mentioned, a magazine plate 42 extends at the inlet 50, 36 of the first and/or second magazine hose 40, 54. The magazine plate 42 is more particularly illustrated in FIG. 6 and comprises a plate body 76 and a closure arrangement 78. The closure arrangement 78 extends in an opening of the plate body 76 and has a closure slider 80, an elastic spring 82 and a toggle mechanism 84.

The closure slider 80 is adapted to move between an open position, in which the inlet 36, 50 of the first and/or second magazine 34, 48 is open, and a closed position, in which said inlet is closed. In the open position of the inlet, fasteners 28 may be transferred to the first and/or second magazine hose 40, 54. An elastic member (for instance the elastic spring 82) elastically bias the closure slider 80 in the closed position. Actually, the closure slider 80 forms a sliding door for the inlet 36, 50 of the first and/or second magazine hose 40, 54.

The closure slider 80 may be provided with compressed air channels 88 such that in the closed position of the closure slider 80, compressed air may go from a compressed air source through the closure slider 80 up to the magazine hose 40, 54. The compressed air can thus push the fasteners 28 through the hose 40, 54 toward the outlet 38, 52. In other words, in the closed position of the closure slider 80, the compressed air channels 88 from the closure slider are aligned or communicate with a channel coming from a compressed air source and the first and/or second magazine hose 40, 54. In the open position of the closure slider 80, the compressed air channels 88 are not communicating anymore with the channel coming from a compressed air source and the magazine hose, such that the feeding of the fasteners is not disturbed. The closure slider 80 may also have a seal function, such that in the closed position, the compressed air from a source is directed to the hose and does not go out through the inlet 36, 50.

The compressed air channel 88 can comprise three portions 88a, 88b, 88c. The first portion 88a communicate with a compressed air source. The first portion 88a can for instance extends along an axis forming an angle with the compressed air channel of the compressed air source. The third portion 88c communicates (in the closed position of the closure slider 80) with the first and/or second magazine hose. The second portion 88b extends between the first portion 88a and the second portion 88b and forms an angle with the first portion 88a and the second portion 88b.

Figures 7A, 7B:
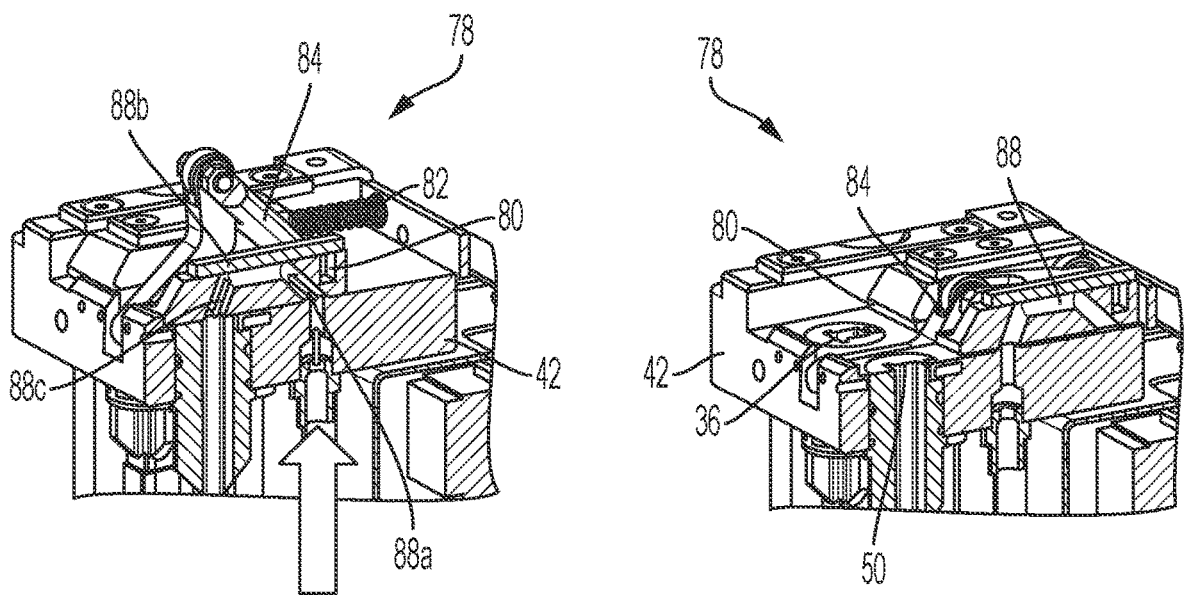
FIG. 7A and FIG. 7B are detailed views of the closure arrangement in an open and a closed position.

FIG. 7A represents the closure slider in the closed position, wherein FIG. 7B represents the closure slider 80 in the open position. Actually, the closure slider 80 can be arranged with first compressed air channels 88 adapted to communicate with the first magazine hose 40 and a second compressed air channels 88 adapted to communicate with the second magazine hose 54.

The toggle mechanism 84 is adapted to move the closure slider 80 from the closed position to the open position. The toggle mechanism 84 comprises a first arm 90, a second arm 92 and a pivoting joint 94 between the first and the second arms 90, 92. In the closed position of the closure slider 80, the first and second arms 90, 92 form an angle at the pivoting joint 94 and the pivoting joint protrudes 94 from the magazine plate 42. In the open position of the closure slider, the first and second arms 90, 92 may be aligned and may not protrude from magazine plate 42 or the closure slider 80.

Besides a bearing 96 is provided around the pivoting joint. The bearing is for example a ball bearing or a roll bearing and typically comprises an inner ring, an outer ring and a plurality of balls (in case of a ball bearing). The inner ring is attached to the pivoting joint 94 and the outer ring is freely movable around the inner ring.

The toggle mechanism 84 and more particularly the outer ring of the bearing 96 is adapted to cooperate with a docking surface 98 of a feed device 100. The toggle mechanism 84 comprises further a rear bearing arranged at a free end of the second arm 92 of the toggle mechanism and adapted to roll on the magazine plate 42. This reduces the friction between the closure slider 80 and the magazine plate significantly.

The feed device 100 belongs to the fastening device system 10 and cooperates with the fastening device 12 to provide fasteners 28 to the first and/or second magazine 34, 48 when the first and/or second magazine 34, 40 is docked to the feed device 100. The feed device 100 may include a reservoir 102 for accommodating a plurality of fasteners 28. FIG. 1 illustrates schematically one reservoir 102, but two reservoirs for two different fasteners 28a, 28b, may be provided. The feed device 100 may also include a singulation device (not represented), in which the fasteners are singulated. Finally, the feed device 100 may include a conveyor device, in particular in the form of a compressed air system. By means of the compressed air system, fasteners 28 can be conveyed through a feed hose 104 to a filling station 106 of the feed device 100, wherein the fasteners 28 can be transferred to the first or second magazine 34, 48. For instance the feed hose 104 may have an outlet with an always open tube section.

Figure 6:
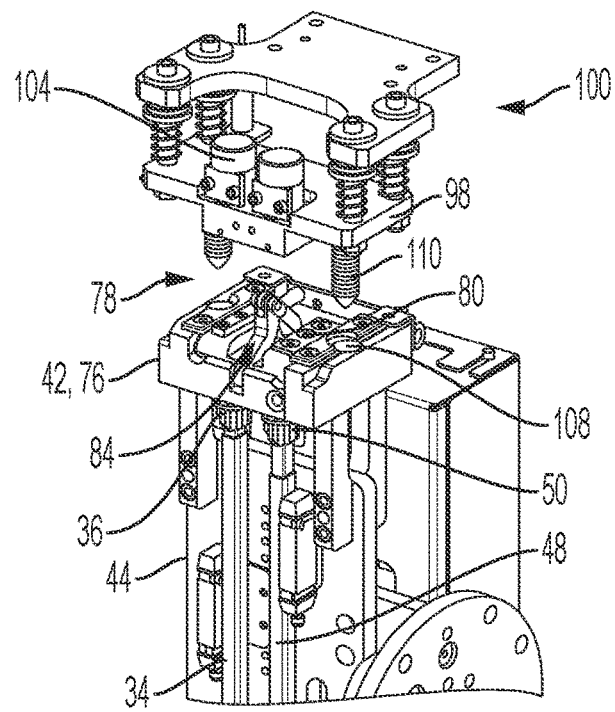
FIG. 6 shows a perspective detailed view of a closure arrangement of the fastening device.
Figure 8A:
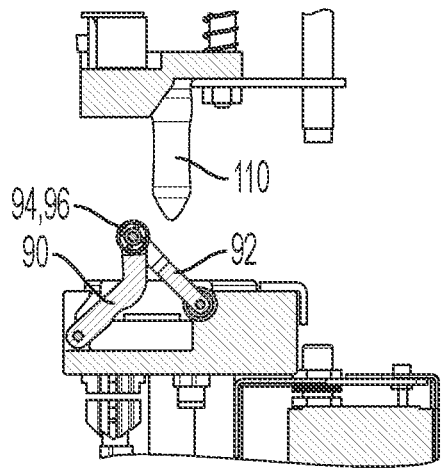
FIG. 8A and FIG. 8B are detailed views of the closure arrangement before and after cooperation with the feed device.
Figure 8B:
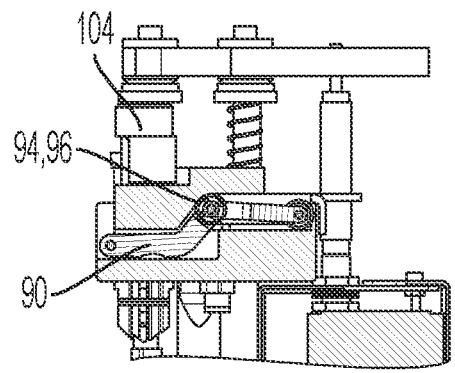
Figure 9:
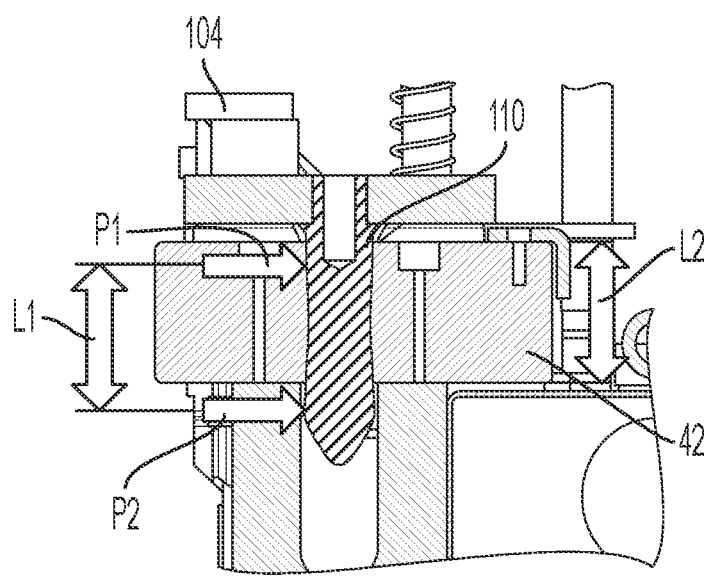
FIG. 9 shows a detailed view of the centering elements of the closure device and the feed device.

In order to allow a safe transfer of the fasteners 28 from the feed device 100 to the first or second magazine 34, 48, the magazine arrangement 32 has a centering element cooperating with a centering element from the feed device 100. For instance, as illustrated in FIG. 8A, FIG. 8B and FIG. 9, the magazine arrangement 32 has a centering recess 108, the feed device has a centering pin 110. More particularly, as depicted in FIG. 6, the magazine arrangement 32 has two centering recesses 108, wherein the feed device has two centering pins 110. The centering pin 108 extends longitudinally along an alignment axis Xc. The centering pin 108 is generally cylindrical, but its cross-section is not constant such that two portions P1, P2 of the centering pin 108 have a cross-section which is larger than the rest of the centering pin 108. This allows a better alignment with a tight fit. The distance L1 between the first portion P1 and the second portion P2 is greater than the thickness L2 of the magazine plate. In other words, the distance between the first portion P1 and the second portion P2 is greater than the length of the centering recess.

In a rest position, the bearing 96 of the toggle mechanism 84 protrudes from the magazine plate 42. When approaching from the docking surface 98, the docking surface 98 pushes the bearing 96, which rolls on the docking surface 98 and thus a force is exerted on the pivoting joint 94 of the toggle mechanism 84 such that the arms are flattened in the direction of the magazine plate 42. Thus, the arms 90, 92 are exerting a force against the elastic member and move the closure slider 80 in the open position.

Figure 10:
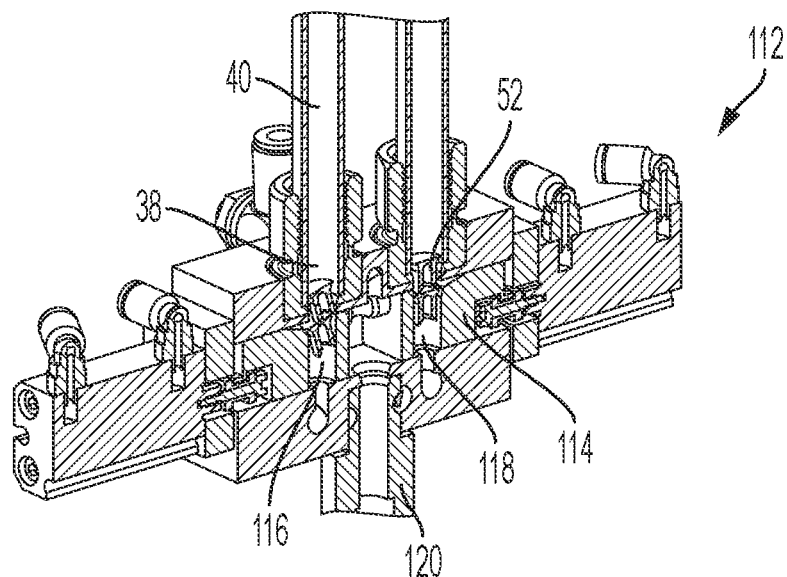
FIG. 10 shows a view of an isolation module of the fastening device.
Figure 11:
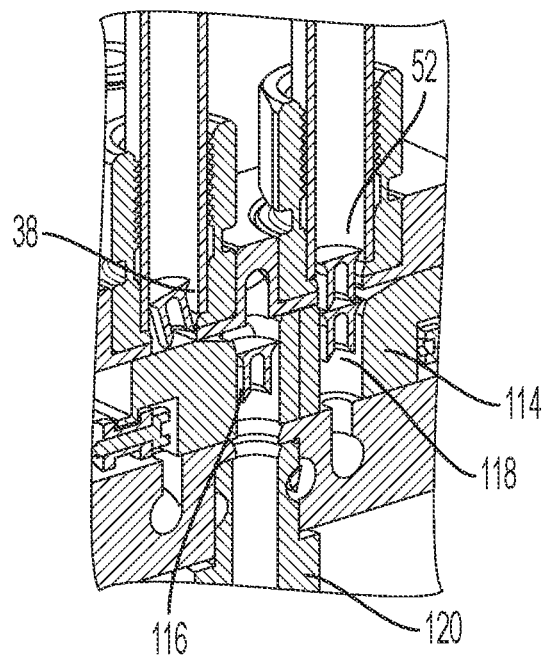
FIG. 11 shows a detailed view of the isolation device of FIG. 10.

At the outlets 38, 52 of the magazines, an isolation module 112 is provided, as shown in FIG. 10 and FIG. 11. The isolation module 112 comprises a drawer 114 with a first and a second recess 116, 118 and adapted to slide such that the first recess 116 may be aligned either with the outlet 38 of the first magazine or with an exit port 120 of the magazine arrangement 32. The drawer 114 can also slide such that the second recess 118 may be aligned either with the outlet 52 or with the exit port 120 of the magazine arrangement. The drawer 114 is moved through actuators, for instance electrical or pneumatic actuators.

During a normal operation, the fastening device system 10 works as follow. This is starting from a state in which a plurality of fasteners 28 are accommodated in the first and/or second magazine 34, 48. In this process, the robot 14 moves the fastening tool 12 to a fastening position where workpieces that are to be joined to one another are located between the punch 24 and the die 26. Then a fastener 28 is removed from the first or second magazine 34, 40 and from the exit port 120. This removal can take place manually but can also take place by an automated transfer device, which is controlled by a control device, for example.

First the punch 24 is moved, in order to carry out the actual fastening process. Then the punch 24 travels back to its initial position, and the fastening tool 12 is moved to a next fastening position. As soon as only few or no fasteners 28a, 28b are present in the first or second magazine 34,40, the fastening tool 12 is moved to the feed device, and more particularly to the filling station. The number of fasteners 28a, 28b located in the first or second magazine 34, 20 can be monitored by the sensor already described, which is mounted on the base plate.

As soon as the magazine plate 36 has approached the docking surface 98, the centering elements of the feed device 100 and fastening device 12 align such that the feed hose 104 is aligned with the inlet 36, 50 of the first or second magazine 34, 48. Then a fastener 28 or a plurality of fasteners 28 is conveyed, for example by a compressed air system from the singulation device or the reservoir 102 to the first or second magazine 34, 40 without hindrance, which is to say through the feed hose and the inlet without hindrance. As soon as the first or the second magazine is filled again, the fastening device can move from the feed device and by doing so, the toggle mechanism 84 can come back to its rest position and thus the closure slider can move to its closed position.

The fastening device system 10 also includes a control device. The control device is designed to control various individual processes and individual devices of the fastening device system 10. In addition, the control device also serves to supply power as appropriate. For example, the control device is connected to the sensors 46, 56. In addition, the control device is designed to actuate the isolation module. Furthermore, the control device is preferably also designed to control the robot 14 in accordance with a specific program. In addition, the control device is also connected to the fastening tool 20 and designed, for example, to operate the punch 24. In this context, the control device can be connected to the robot 14 and/or the fastening head 12 by a cable arrangement. In addition, the control device can be connected to the filling station 46 by a cable arrangement, in particular in the form of an individual sensor cable.

The magazine arrangement 32 as described above is thus separated in two units. The first unit 124 comprises all the controllers with valve terminal, port expander, valves, pressure regulators, . . . . The second unit 126 comprises the first and second magazine hoses, the outlets, the inlets, the isolation module and the corresponding sensors. Such partition facilitates the mounting and maintenance operations. The first unit 124 is not encapsulated in a casing, in order to leave accessible the different plug connections, chokes, pressure meters, . . . . The magazine arrangement 32 is sensibly symmetrically arranged, such that an adaptation to different frames or position is possible.

Although exemplary embodiments of the present invention have been shown and described, it will be appreciated by those skilled in the art that changes may be made to these embodiments without departing from the principles and spirit of the invention, the scope of which is defined in the appended claims and their equivalents.

What is claimed is:

1. A fastening device for transporting a fastener to a workpiece and for joining the fastener to the workpiece, the fastening device comprising:

a fastening tool that is movable by a programmable handling device and operable for joining the fastener;

a magazine arrangement mounted on the fastening tool, the magazine arrangement including a magazine operable for holding the fastener, the magazine including an inlet, and an outlet, and a magazine hose;

a magazine plate extending at the inlet of the magazine, and a base plate extending along the magazine and to which the magazine is connected;

a sensor adapted to detect the presence of a fastener in the magazine; and wherein the magazine plate includes a plate body and a closure arrangement, the closure arrangement including:

a closure slider adapted to move between an open position, in which the inlet of the magazine is open and a closed position in which the inlet is closed, an elastic member biasing the closure slider in the closed position, and a toggle mechanism adapted to move the closure slider from the closed position to the open position.

2. A fastening device according to claim 1, wherein the toggle mechanism is movable between a first position, in which the closure slider is in the closed position, and a second position, in which the closure slider is in the open position, and wherein the toggle mechanism includes a first arm, a second arm, and a pivoting joint located between the first arm and the second arm, such that first arm and the second arm are pivotably connected.

3. A fastening device according to claim 2, wherein the toggle mechanism includes a rear bearing arranged at a free end of the second arm of the toggle mechanism and adapted to roll on the magazine plate.

4. A fastening device according to claim 1, wherein the closure slider includes a compressed air channel which communicates with the magazine hose when the closure slider is in the closed position.

5. A fastening device according to claim 4, wherein the magazine is a first magazine, the magazine hose is a first magazine hose, and wherein the magazine arrangement further includes a second magazine for accommodating a second fastener, the second magazine having a second inlet and a second outlet and a second magazine hose, the magazine plate extends at the second inlet of the second magazine and the base plate extends along the second magazine, and the second magazine is connected to the base plate.

6. A fastening device according to claim 5, wherein the closure slider further includes a second compressed air channel which communicates with the second magazine hose when the closure slider is in the closed position.

7. A fastening device according to claim 5, wherein the sensor is adapted to detect the presence of a fastener in the first or second magazine, and wherein the sensor is connected to the base plate, and a spacer is located between the first and the second magazine hose, and the spacer includes a demounting arrangement operable for removal and replacement of the first or second magazine hose.

8. A fastening device according to claim 7, wherein the demounting arrangement includes an elastic pin adapted to be moved between a locked position and a release position.

9. A fastening device according to claim 8, wherein the spacer includes a spacer body, an anchoring body, and the elastic pin, and wherein the anchoring body is fixed to the base plate and extends longitudinally orthogonal to the base plate, and wherein the anchoring body includes a first recess and a second recess, and in which the elastic pin is elastically biased toward the locked position.

10. A fastening device according to claim 9, wherein the spacer body is slidable relative to the anchoring body between a working position, in which the first or second magazine are operable to receive the fastener, and a maintenance position, in which the first or second magazine are removable from the fastening device.

11. A fastening device according to claim 1 and further comprising a feed device, and wherein the magazine arrangement has a first centering element cooperating with a second centering element from the feed device.

12. A fastening device according to claim 11, wherein the first centering element includes one of a centering recess or a centering pin, and the second centering element includes the other of the centering recess or the centering pin.

13. A fastening device according to claim 12, wherein the centering pin extends longitudinally and has a non-constant cross-section.

14. A fastening device according to claim 11, wherein the feed device further includes a docking surface and a filling station, the filling station further including a feed hose, and wherein the toggle mechanism further includes a bearing between a first arm and a second arm of the toggle mechanism and adapted to roll on the docking surface and arranged such that the pressure of the docking surface on the toggle mechanism allows the toggle mechanism to move the closure slider from the closed position to the open position.

15. A method comprising:

providing a fastening device for transporting a fastener to a workpiece and for joining the fastener to the workpiece, the fastening device comprising:

a fastening tool that is movable by a programmable handling device and operable for joining the fastener;

a magazine arrangement mounted on the fastening tool, the magazine arrangement including a magazine operable for holding the fastener, the magazine including an inlet, and an outlet, and a magazine hose;

a magazine plate extending at the inlet of the magazine, and a base plate extending along the magazine and to which the magazine is connected, a sensor adapted to detect the presence of a fastener in the magazine; and wherein the magazine plate includes a plate body and a closure arrangement, the closure arrangement including:

a closure slider adapted to move between an open position, in which the inlet of the magazine is open and a closed position in which the inlet is closed, an elastic member biasing the closure slider in the closed position, and a toggle mechanism adapted to move the closure slider from the closed position to the open position;

moving the magazine arrangement to a feed device, wherein the feed device includes a tube section and an outlet opening;

orienting the magazine arrangement with respect to the outlet opening;

aligning the magazine arrangement and the feed device through an interaction of respective centering elements;

moving the magazine arrangement and the feed device into contact with each other such that a docking surface of the feed device pushes the toggle mechanism of the magazine arrangement from a first position and thereby opens the closure slider of the magazine arrangement; and conveying the fastener through the tube section and the outlet opening into the magazine arrangement.

16. A fastening device operable for transporting a fastener to a workpiece and for joining the fastener to the workpiece, the fastening device movable by a programmable handling device between a joining position at the workpiece and a reload position, and the fastening device comprising:
- a fastening tool; and
- a magazine arrangement mounted on the fastening tool, the magazine arrangement including:
  - a magazine operable for holding the fastener and including an inlet, an outlet, and a magazine hose between the inlet and the outlet;
  - a base plate extending along the magazine and to which the magazine is connected; and
  - a magazine plate extending at the inlet of the magazine, and including a plate body and a closure arrangement, the closure arrangement including:
    - a closure slider movable between an open position, in which the inlet of the magazine is open and a closed position in which the inlet is closed;
    - an elastic member biasing the closure slider to the closed position; and
    - a toggle mechanism operable to move the closure slider from the closed position to the open position.

17. A fastening device according to claim 16, wherein the toggle mechanism is movable between a first position in which the closure slider is closed and a second position in which the closure slider is open, and the toggle mechanism includes:
- a first arm and a second arm, and a pivoting joint located between the first arm and the second arm; and;
- a first bearing located at a free end of the second arm and adapted to roll on the magazine plate.

18. A fastening device according to claim 16, wherein the closure slider includes a compressed air channel which communicates with the magazine hose when the closure slider is in the closed position.

19. A fastening device according to claim 16, wherein the magazine arrangement further includes a spacer located adjacent the magazine hose and operable for removal and replacement of the magazine hose, the spacer including:
- a spacer body fixed to the base plate and extending longitudinally orthogonal to the base plate;
- an anchoring body partially defining a first recess and a second recess;
- an elastic pin movable between a locked position and a release position and biased toward the locked position; and
- wherein the spacer body is slidable relative to the anchoring body between a working position, in which the magazine hose is aligned to receive the fastener, and a maintenance position, in which the magazine hose is removable from the magazine arrangement.

20. A fastening device according to claim 16 and further comprising a feed device including a docking surface and a filling station, and wherein:
- the magazine arrangement further includes a first centering element operable for cooperation with a second centering element of the feed device, and the first centering element includes one of a centering recess or a centering pin, and the second centering element includes the other of the centering recess or the centering pin; and the centering pin extends longitudinally and has a non-constant cross-section; and
- the toggle mechanism is arranged so that a pressure of the docking surface on the toggle mechanism allows the toggle mechanism to move the closure slider from the closed position to the open position when the programmable handling device moves the magazine arrangement into contact with the docking surface.

* * * * *